Nov. 15, 1932.   W. M. PAXSON   1,887,659
RAKE CLEANER
Filed April 23, 1931
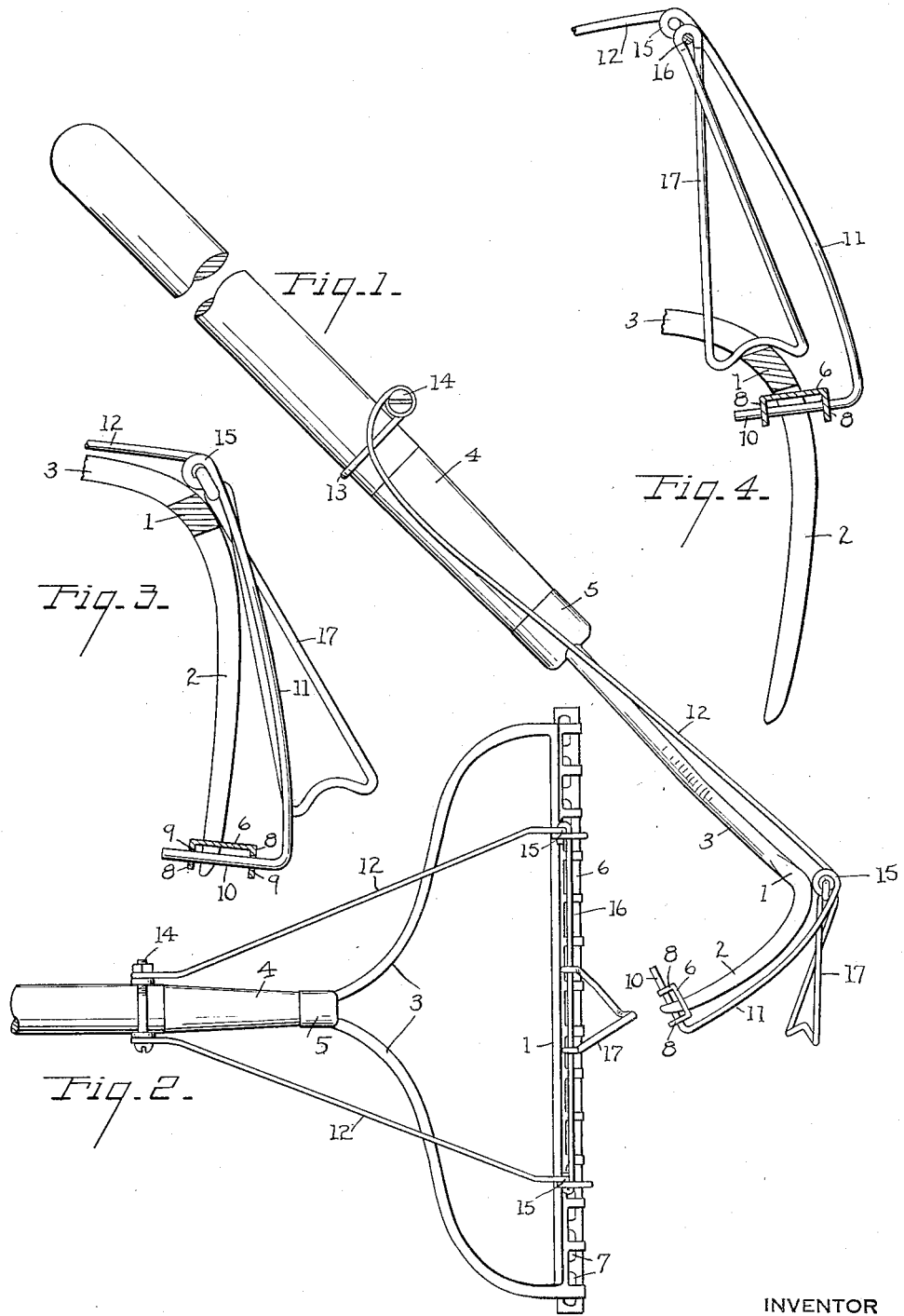
INVENTOR
Willard M. Paxson
BY
Chappell & Earl
ATTORNEYS Patented Nov. 15, 1932

1,887,659

UNITED STATES PATENT OFFICE

WILLARD M. PAXSON, OF DOWAGIAC, MICHIGAN, ASSIGNOR OF ONE-HALF TO DONALD H. MILES, OF CASSOPOLIS, MICHIGAN

RAKE CLEANER

Application filed April 23, 1931. Serial No. 532,267.

The main objects of this invention are to provide a rake cleaner or stripper which may be readily applied to rakes now widely used and of considerable variation in pitch, angle and shape of the teeth and also one which is well adapted either for use as a lawn rake; that is, for raking grass or leaves, or as a garden rake.

A further object is to provide a rake cleaner or stripper embodying these advantages which may be adjusted so that the stripper is automatically urged to outer or stripping or discharging position or yieldingly retained in retracted position.

A still further object is to provide a rake cleaner that is extremely simple in construction, economical to manufacture and efficient in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a side view of a rake embodying the features of my invention, the handle being partially broken away.

Fig. 2 is a top or plan view with the handle partially broken away.

Fig. 3 is an enlarged fragmentary view partially in cross section showing the mounting of the stripper bar supporting arms.

Fig. 4 is a view similar to Fig. 3 showing the stripper bar locked in an inoperative position.

Referring to the drawing, the rake head 1 is provided with curved teeth 2 with bars or shank members 3 extending from the ends of the head 1 and secured to a rake handle 4 by means of a thimble 5 or the like. It will be understood that these parts are of a type now extensively used and commonly designated as a garden rake.

The stripper comprises a bar 6 of channel shape preferably of sheet metal, its web portion having holes 7 through which the teeth 2 of the rake extend. The flanges 8 of the bar 6 are provided with holes 9 which are adapted to loosely receive fingers 10 which are bent inwardly for this purpose from the downwardly extending portions 11 of the stripper supporting arms 12. The bar 6 may be said to be floatingly supported by the arms 12.

The arms 12 are preferably formed from a suitably bent single piece of wire having a loop 13 embracing the handle 4 above the thimble 5 as illustrated, said loop having coils providing eyes adapted to accommodate a clamping bolt 14 for tightly securing the loop 13 to the handle 4.

The arms 12 curve downwardly from the ends of the handle embracing loop 13 alongside of the handle 4 and then upwardly over the head 1, as shown. Over the head 1, the arms 12 are provided with small coils 15 through which pass a connecting member or cross rod 16 having its ends bent so as to securely engage the arms 12 at the coils 15. The arms 12 diverge, the outer ends of which are secured in fixed spaced relation to each other over the head 1 by the cross or tie member 16.

As pointed out above, the arms 12 extend downwardly from the small coils 15 over the head 1 in curved portions 11 alongside of the teeth 2 of the rake. The portions 11 terminate in the fingers 10 which are adapted to engage the ends of the stripper 6 in the openings 9.

For convenience and economy of manufacture, the handle engaging loop 13, the arms 12, the extensions 11 and the fingers 10 are all made from a single piece of resilient wire. The arms 12 are fashioned so that the bar 6 will be held in the position shown by Figs. 1 and 3 near the ends of the teeth 2.

In operation, the stripper bar may be moved upwardly along the teeth of the rake but at all times the resilient arms 12 urge the stripper bar to its lowermost position.

A latch 17 consisting of a suitably bent piece of wire is carried by the connecting member 16 for engaging the head 1 of the rake and locking the stripper bar 6 in its uppermost position adjacent the head when desired. In this position of the stripper bar, the rake may be operated in a normal manner. The position of the arms 12 and the stripper bar 6 when locked in an inoperative position by the latch 16 is illustrated by Fig. 4.

The stripper does not interfere with the normal use of the rake but may be brought into use to clean the teeth. The stripper bar being floatingly mounted upon the arms accommodates itself to the particular curve or pitch of the teeth and also permits considerable variation in the positioning of the handle engaging loop 12.

While I have illustrated and described a preferred embodiment of my invention, it will be understood that various changes may be made therein without departing from the scope of my broader claims.

Having thus described my invention, what I claim as new and desire to secure by Letters Patent, is:

1. The combination with a rake having a handle, of a stripper bar of channel cross section, a spring support for said stripper bar consisting of a single piece of wire having a loop which embraces the handle, the ends of said loop having coils formed therein providing clamping bolt eyes, a clamping bolt extending through said eyes and securing said loop to said handle, a spacing member engaging coils provided therefor in said arms and holding the outer ends of said arms apart, said arms being bent downwardly and inwardly adjacent said last named coils and terminating in side supporting fingers that extend through openings in the flanges of said channel member, and a latch carried by said spacing member for locking said stripper bar near the head of the rake when desired.

2. The combination with a rake having a handle, of a stripper bar of channel cross section, a spring support for said stripper bar consisting of a single piece of wire having a loop which embraces the handle, diverging arms extending from said loop, and a spacing member secured to coils provided therefor in said arms and holding the outer ends of said arms apart, said arms being bent downwardly and inwardly adjacent said last named coils and terminating in side supporting fingers that extend through alined openings in the flanges of said channel member.

3. A stripper supporting device for a rake having a handle, consisting of a single piece of resilient wire having a handle embracing loop, means connecting the ends of said loop, a stripper, said wire having a pair of arms diverging from said loop and being bent over the head of the rake and downwardly alongside of the teeth thereof and terminating in fingers loosely engaging said stripper, spacing means connecting the arms at said bends, and means carried by said spacing means for locking the arms to support the stripper in an inoperative position adjacent the head of the rake.

4. The combination with a rake provided with a handle, of a stripper bar, a support for said stripper bar comprising a pair of outwardly diverging spring arms provided with a handle engaging clip at their inner ends and having down-turned portions at their outer ends, said down-turned portions terminating in fingers on which said stripper bar is mounted, a cross piece connecting the outer ends of said arms, and a strut mounted on said cross piece to be moved into engagement with said rake head for supporting the stripper in retracted position.

5. The combination with a rake having a handle, of a stripper bar, spring supporting arms for said stripper bar mounted on said handle and acting to normally urge said stripper bar downwardly, and a support connected to said arms to be moved into engagement with the rake head for supporting the stripper bar in retracted position.

6. A stripper supporting device for a rake having a handle, consisting of resilient wire having a handle embracing loop, a stripper, said wire having a pair of arms diverging from said loop and being bent over the head of the rake and downwardly alongside of the teeth thereof and terminating in fingers engaging said stripper, spacing means connecting the arms at said bends, and means carried by said spacing means for locking the stripper in an inoperative position adjacent the head of the rake.

In witness whereof I have hereunto set my hand.

WILLARD M. PAXSON.